United States Patent
Takaoka

[19]

[11] Patent Number: 6,129,171
[45] Date of Patent: Oct. 10, 2000

[54] ELECTRIC POWER STEERING DEVICE

[75] Inventor: Manabu Takaoka, Kashiba, Japan

[73] Assignee: Koyo Seiko Co., Ltd., Osaka, Japan

[21] Appl. No.: 09/056,754

[22] Filed: Apr. 8, 1998

[30] Foreign Application Priority Data

Apr. 10, 1997 [JP] Japan ..................................... 9-110269

[51] Int. Cl.⁷ ...................................................... B62D 5/04
[52] U.S. Cl. ......................... 180/444; 74/388 PS; 74/397
[58] Field of Search .................... 180/444, 443; 74/388 PS, 63, 216.3, 397, 414, 413, 325, 329, 331

[56] References Cited

U.S. PATENT DOCUMENTS

| | | |
|---|---|---|
| 2,235,176 | 3/1941 | Tangen . |
| 4,380,991 | 4/1983 | Richter et al. ............................. 74/325 |
| 4,522,278 | 6/1985 | Kitagawa et al. ...................... 180/444 |
| 4,593,780 | 6/1986 | Saito . |
| 4,825,972 | 5/1989 | Shimizu ................................... 180/444 |
| 5,711,396 | 1/1998 | Joerg et al. ............................. 180/444 |
| 5,738,181 | 4/1998 | Kato ....................................... 180/400 |

FOREIGN PATENT DOCUMENTS 3-15591  3/1991  Japan .

*Primary Examiner*—Anne Marie Boehler
*Attorney, Agent, or Firm*—Jacobson, Price, Holman & Stern, PLLC

[57] ABSTRACT

In an electric power steering device, a rotating member is screwed onto a rack, which meshes with a pinion rotated by steering manipulation, via a screw mechanism. The rotation of a motor for generating steering assistance force is transmitted to the rotating member via a gear mechanism. The vehicle is turned by longitudinal movement of the rack caused by rotation of the pinion. The steering assistance force is applied in the longitudinal direction of the rack by driving the rotating member by means of the motor. The gear ratio of the gear mechanism is set such that the speed of rotation of the rotating member is equal to or greater than the speed of rotation of the motor.

1 Claim, 5 Drawing Sheets

ELECTRIC POWER STEERING DEVICE

FIELD OF THE INVENTION

The present invention relates to an electric power steering device applying steering assistance force in the longitudinal direction of a rack that meshes with a pinion which is rotated by steering manipulation, by driving a rotating member screwed onto the rack by-means of a motor.

DESCRIPTION OF THE RELATED ART

For example, in an electric power steering device as disclosed in U.S. Pat. No. 4,593,780 or Japanese Examined Patent Publication No. HEI 3-15591, steering assistance force is applied in the longitudinal direction of a rack that meshes with a pinion which is rotated by steering manipulation, by transmitting the rotation of a motor via a gear mechanism to a rotating member which is screwed onto the rack via a screw mechanism.

Conventionally, since the gear mechanism functions as a speed reducing mechanism, the rotational speed of the rotating member is less than that of the motor. By amplifying the output of the motor by means of this speed reduction, it is possible to miniaturize the motor. However, since the gear mechanism is constructed to reduce the rotational speed of the motor, the inertia of the motor acting on the rotating member, which is rotated by the action of caster effect of travelling vehicle's wheels when the steering wheel is turned back towards the straight-ahead driving position, is amplified by the square of the reduction rate. When the inertia of the motor acting on the rotating member is increased in this way, the vehicle's wheels can not return smoothly to the straight-ahead position by the action of wheel alignment, so that the feeling in steering manipulation is deteriorated. It might be thought that the output of the motor should be set to a level which corresponds to the inertia, but complex output control is required to achieve this.

The need to miniaturize the motor is based principally on the limitation of installation space, therefore, when there is sufficient installation space, there is little need for the miniaturization. Moreover, with the improvement in motor performance in recent years, it is possible to obtain motors which are sufficiently small in size and produce output enough not to require amplification. Therefore, it is of no purpose to miniaturize the motor at the sacrifice of the feeling in steering manipulation.

It is an object of the present invention to provide an electric power steering device which enables the aforementioned problems relating to the prior art to be resolved.

SUMMARY OF THE INVENTION

In a electric power steering device in a vehicle comprising: a pinion that is rotated by steering manipulation, a rack that meshes with this pinion; a rotating member that is screwed onto the rack via a screw mechanism; a motor for generating steering assistance force; and a gear mechanism that transmits the rotation of the motor to the rotating member; wherein the vehicle is turned by longitudinal movement of the rack induced by rotation of the pinion, and the steering assistance force is applied in the longitudinal direction of the rack by driving the rotating member by means of the motor, the present invention is characterized in that the gear ratio of the gear mechanism is set such that the speed of rotation of the rotating member is equal to or greater than the speed of rotation of the motor.

According to the constitution of the present invention, since the speed of rotation of the motor is not reduced by the gear mechanism when the rotation is transmitted to the rotating member, the inertia of the motor acting on the rotating member is not amplified when the steering wheel is turned towards its straight-ahead position. Thereby, it is possible to provide an electric power steering device whereby deterioration of the feeling in steering manipulation can be prevented without the need for complex control.

It is preferable that the gear mechanism in the electric power steering device according to the present invention comprises a first gear which rotates together with the output shaft of the motor, a second gear which meshes with this first gear, and a third gear which meshes with this second gear and rotates together with the rotating member, and the center-to-center distance between the first gear and the second gear is equal to the center-to-center distance between the second gear and the third gear.

According to this constitution, in design modification step of the gear mechanism, it is possible to alter the center-to-center distance between the first and third gears by changing the diameter of the second gear without changing the diameters of the first gear and third gear. Therefore, if the center-to-center distance between the first gear and the third gear is altered in accordance with the size of the motor, the first gear and third gear used after the modification can be standardized with those used before the modification.

It is preferable that the second gear is displaceable in a direction so that the relative center-to-center distance between the first gear and second gear and the center-to-center distance between the second gear and third gear do not change due to the displacement of the second gear.

By this arrangement, it is possible to regulate back-lash between the first gear and second gears, and back-lash between the second gear and third gear.

DESCRIPTION OF THE PREFERRED EMBODIMENTS

Below, an embodiment of the present invention is described with reference to the drawings.

Figure 1:
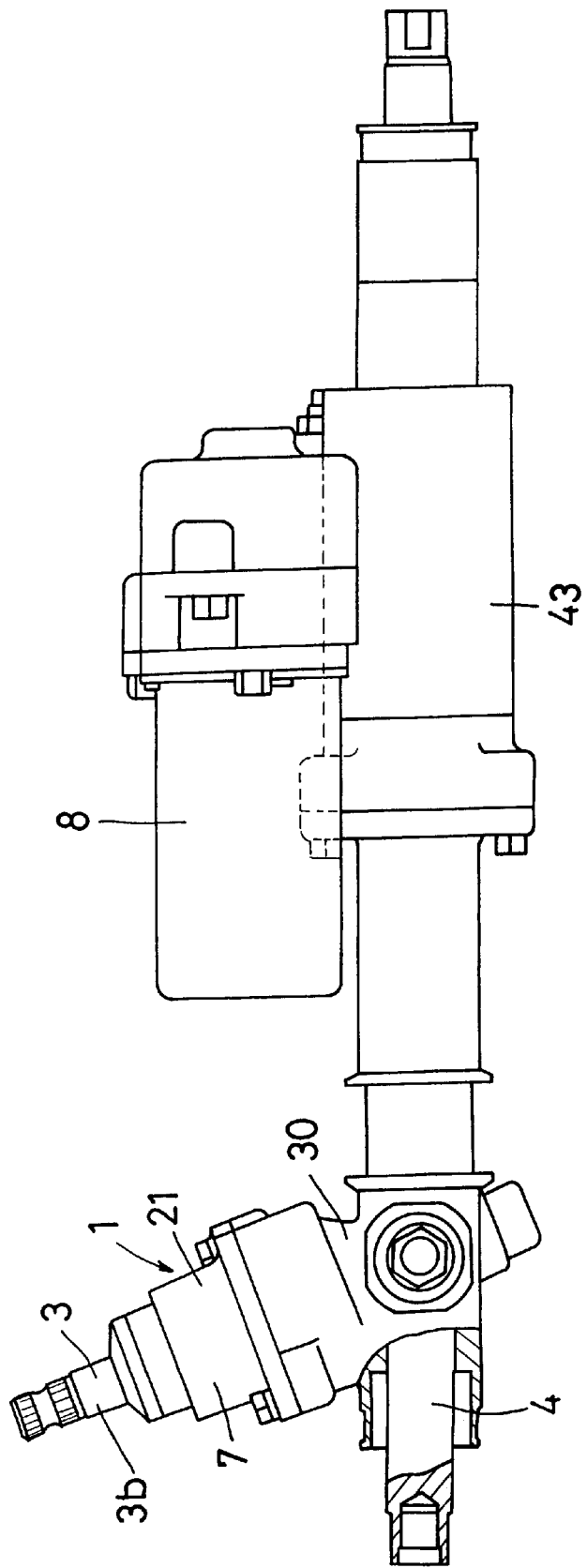
FIG. 1 is a front view of an electric power steering device of an embodiment according to the present invention.
Figure 2:
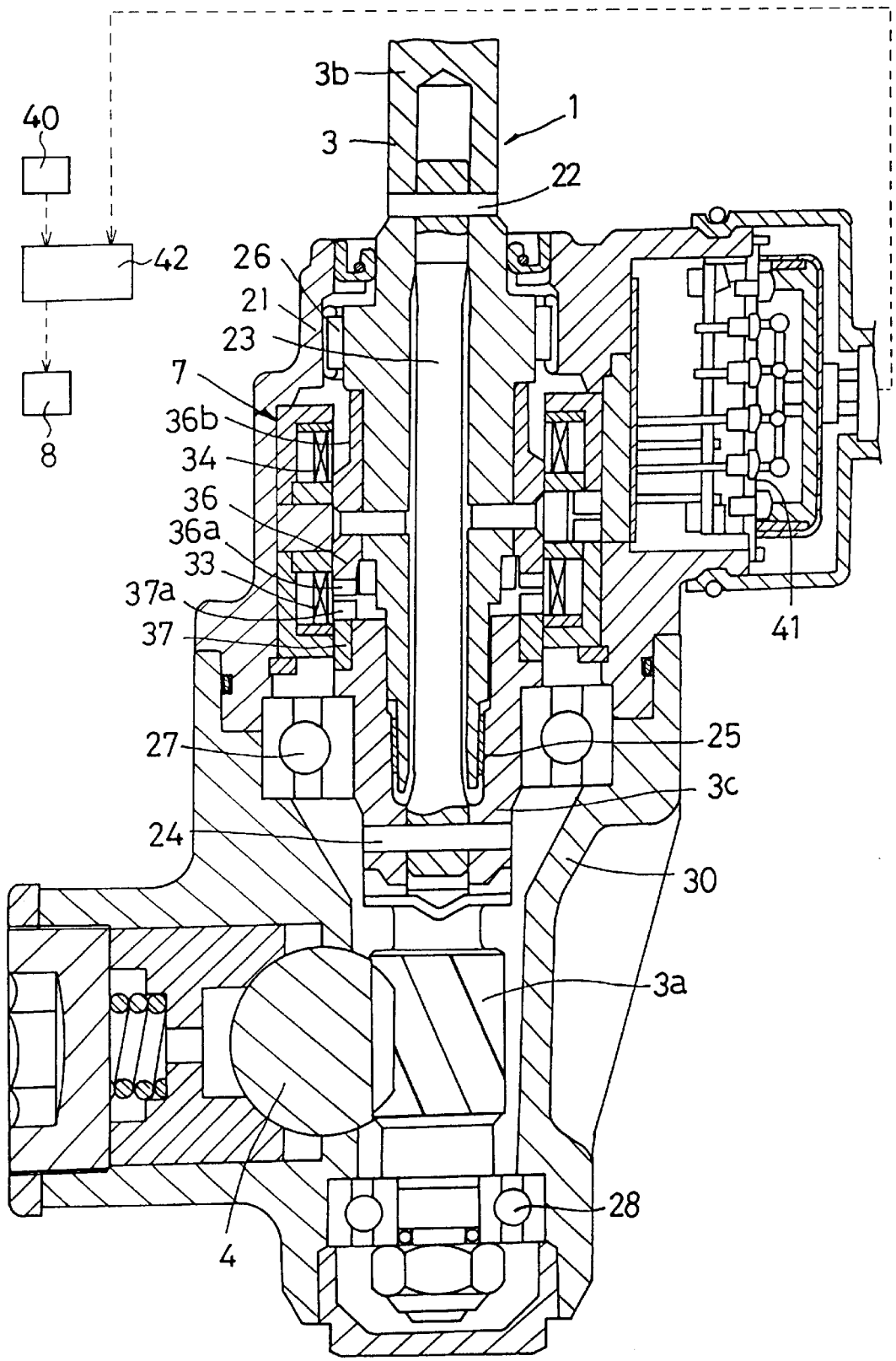
FIG. 2 is a sectional view of the electric power steering device of the embodiment according to the present invention.

A rack-and-pinion type electric power steering device 1 in a vehicle as illustrated in FIG. 1 and FIG. 2 comprises a steering shaft 3 which is rotated by manipulation of a steering wheel (omitted from drawing), a pinion 3a formed on one end of this steering shaft 3, and a rack 4 which meshes with this pinion 3a. The vehicle's wheels (omitted from the drawing) are connected to each end of the rack 4. The rack 4 is caused to move in its longitudinal direction along the width of the vehicle by rotation of the pinion 3a. The vehicle is turned by this movement of the rack 4.

In order to provide steering assistance force corresponding to the steering torque transmitted by the steering shaft 3, there are provided a torque sensor 7 for detecting this steering torque, a motor 8 which is driven to generate steering assistance force in accordance with the detected steering torque, and a mechanism for converting the rotational force of the motor 8 to an axial force and transmitting it to the rack 4.

The steering shaft 3 is supported via bearings 26, 27 and 28 by a housing 21 of the torque sensor 7 and a pinion housing 30 covering the pinion 3a. Inside these housings 21, 30, the steering shaft 3 is constructed of a first shaft 3b, which is arranged adjacent to the steering wheel, and a second shaft 3c, which is fitted to the outer circumference of the first shaft 3b via a bush 25 such that it can rotate relatively to the first shaft 3b. The pinion 3a is formed on the second shaft 3c. A torsion bar 23 is connected to both shafts 3b, 3c by pins 22, 24, thereby making the shafts 3b, 3c capable of relative rotation elastically in accordance with the steering torque.

The torque sensor 7 comprises first and second detecting coils 33, 34, which are supported by the sensor housing 21, a first detecting ring 36, which is made from a magnetic material and fitted to the first shaft 3b, and a second detecting ring 37, which is made from a magnetic material and fitted to the second shaft 3c. One end of the first detecting ring 36 and one end of the second detecting ring 37 are positioned such that they oppose each other. These mutually opposing ends of the detecting rings 36, 37 are provided respectively with a plurality of teeth 36a, 37a along the circumference thereof. The other end of the first detecting ring 36 is a small-diameter section 36b having a smaller outer diameter than the one end. The first detecting coil 33 is positioned such that it covers the region where the first detecting ring 36 and second detecting ring 37 oppose each other. The second detecting coil 34 is positioned such that it covers the first detecting ring 36. Each detecting coil 33, 34 is connected by wiring to a printed circuit board 41 attached to the sensor housing 21.

Figure 3:
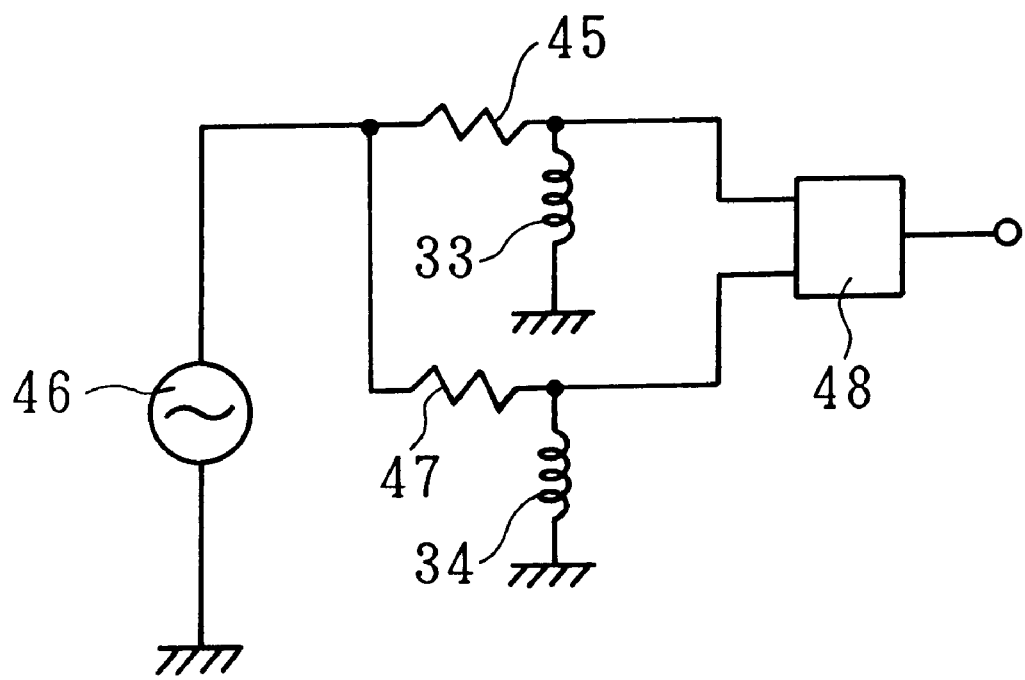
FIG. 3 is an illustrative view of the circuit composition of a torque sensor in the electric power steering device of the embodiment according to the present invention.

A signal processing circuit is formed on the printed circuit board 41 as shown in FIG. 3. Specifically, the first detecting coil 33 is connected via a resistance 45 to an oscillator 46, the second detecting coil 34 is connected via a resistance 47 to the oscillator 46, and the detecting coils 33, 34 are connected to a differential amplifier circuit 48. When the torsion bar 23 is twisted by the transmission of steering torque, the first detecting ring 36 and the second detecting ring 37 rotate relatively to each other. Due to this relative rotation, the opposing surface area between the teeth 36a of the first detecting ring 36 and the teeth 37a of the second ring 37 changes. This change in surface area causes a variation in the magnetic resistance with respect to the magnetic flux, which is generated by the first detecting coil 33 and passes through both sets of teeth 36a, 37a. The output of the first detecting coil 33 changes according to the change of magnetic resistance. Thereby, the steering torque corresponding to this output is detected. Furthermore, the second detecting coil 34 is positioned opposing the small-diameter section 36b of the first detecting ring 36. The outer diameter of the small-diameter section 36b is set such that, in a state where there is no action due to steering resistance, the magnetic resistance with respect to the magnetic flux generated by the first detecting coil 33 is equal to the magnetic resistance with respect to the magnetic flux which is generated by the second detecting coil 34 and passes through the small-diameter section 36b. Thereby, the output fluctuation in the first detecting coil 33 due to temperature fluctuation is equal to the output fluctuation in the second detecting coil 34 due to temperature fluctuation, so that the output fluctuation can be eliminated by the differential amplifier circuit 48. In other words, temperature-induced fluctuations in the detection values of steering torque can be compensated.

The torque sensor 7, the motor 8 and a vehicle speed sensor 40 are connected to a control device 42. The output from the motor 8 is controlled by the control device 42 such that it corresponds to the steering torque detected by the torque sensor 7. Furthermore, the output from the motor 8 is reduced when the speed detected by the vehicle speed sensor 40 is high, thereby improving driving stability, and it is increased at lower speeds, thereby improving turning characteristics.

Figure 4:
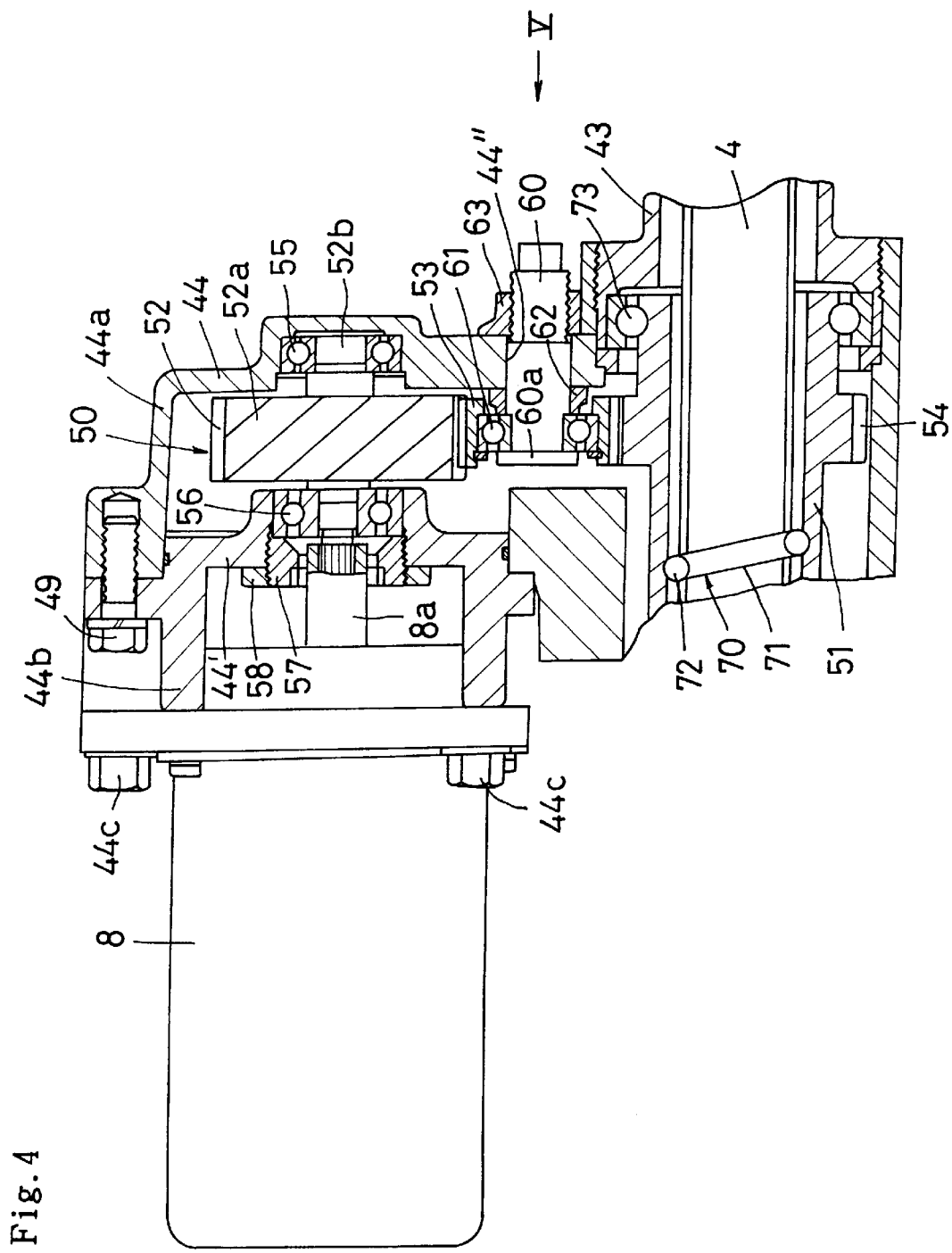
FIG. 4 is a sectional view of the principal parts of the electric power steering device of the embodiment according to the present invention.
Figure 5:
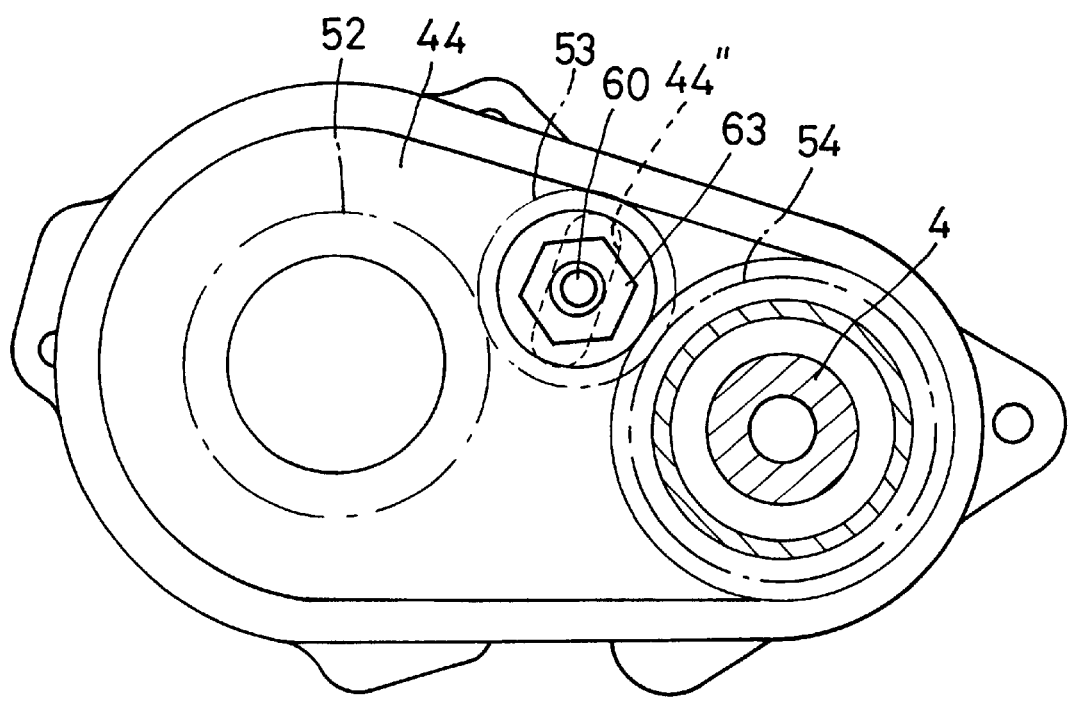
FIG. 5 is a view in the direction of arrow V shown in FIG. 4.

As shown in FIG. 4 and FIG. 5, the rack 4 projecting from the pinion housing 30 is covered by a rack housing 43. A gear housing 44 is attached to this rack housing 43. The motor 8 is attached to this gear housing 44 by bolts 44c. The gear housing 44 is constituted by coupling two members 44a, 44b by means of bolts 49. A gear mechanism 50 is provided inside this gear housing 44.

The gear mechanism 50 transfers the rotation of the motor 8 to a rotating member 51. This rotating member 51 is screwed onto the rack 4 by means of a ball screw mechanism 70. The gear mechanism 50 comprises a first gear 52, a second gear 53 which meshes with this first gear 52, and a third gear 54 which meshes with this second gear 53.

The first gear 52 comprises a gear body 52a and a shaft section 52b which projects axially in both directions from the gear body 52a. The shaft section 52b is supported via bearings 55, 56 by a gear housing 44. One of the bearings 55 is sandwiched between the-shaft section 52b and the internal end surface of the gear housing 44. The other bearing 56 is fitted into a partition 44' inside the gear housing 44, and is sandwiched between a pressing member 57, which is screwed into the partition 44', and the shaft section 52b. A lock-nut 58 is screwed onto the outer circumference of the pressing member 57. One end of the shaft section 52b is fitted to the output shaft 8a of the motor 8 via a serration, splines, or the like, such that the first gear 52 rotates together with the output shaft 8a.

The second gear 53 is an idle gear, which is fitted onto a supporting shaft 60 via a bearing 61. This supporting shaft 60 is inserted into an elongated hole 44" formed in the gear housing 44. The bearing 61 is sandwiched between a large-diameter section 60a at one end of the supporting shaft 60 and a spacer 62 which contacts the inner end surface of the gear housing 44. The other end of this supporting shaft 60 projects outside the gear housing 44, and the supporting shaft 60 is fixed to the gear housing by means of a nut 63 which is screwed onto the outer circumference of this projecting section. By loosening this nut 63 and displacing the supporting shaft 60 in the longitudinal direction of the elongated hole 44", it is possible to regulate the back-lash between the first gear 52 and second gear 53, and the back-lash between the second gear 53 and the third gear 54. To be more precise, each center axis of the gear 52, 53, 54 is parallel to each other, and the center-to-center distance between the first gear 52 and the second gear 53 is made equal to the center-to-center distance between the second gear 53 and the third gear 54, and the longitudinal direction of the elongated hole 44" is determined such that these relative center-to-center distances do not change even if the supporting shaft 60 is displaced. In other words, the second gear 53 is displaceable in a direction so that the relative center-to-center distance between the first and second gears 52, 53 and the center-to-center distance between the second and third gears 53, 54 do not change due to the displacement of the second gear 53.

In design modification step of the gear mechanism 50, the center-to-center distance between the first gear 52 and the third gear 54 can be altered by changing the diameter of the second gear 53 without changing the diameters of the first and third gears 52 and 54. Consequently, if the center-to-center distance between the first gear 52 and the third gear 54 is altered in accordance with the size of the motor 8, the first gear 52 and third gear 54 used after the modification can be standardized with those used before the modification.

The third gear 54 is formed integrally on the outer circumference of the rotating member 51, so that the third gear 54 rotates together with the rotating member 51. The ball screw mechanism 70 comprises the rotating member 51 which serves as a ball nut, and a ball screw 71 formed integrally on the outer circumference of the rack 4. The rotating member 51 is screwed onto the ball screw 71 via balls 72. One end of the rotating member 51 comprises the inner ring of a ball bearing 73, and the rotating member 51 is supported by the rack housing 43 via this ball bearing 73. Therefore, by driving the rotating member 51 by means of the motor 8 via the gear mechanism 50, it is possible to apply steering assistance force in the longitudinal direction of the rack 4. In so doing, the output from the motor 8 is amplified by the ball screw mechanism 70. The motor 8 is selected so that it has an output capable of generating the required steering assistance force.

The gear ratio of the gear mechanism 50 is set such that the speed of rotation of the rotating member 51 is equal to or greater than the speed of rotation of the motor 8. In the present embodiment, the gear ratio is set to 1 by providing equal numbers of teeth on the first gear 52 and the third gear 54, therefore, the speed of rotation of the rotating member 51 is equal to the speed of rotation of the motor 8.

According to the abovementioned constitution, since the speed of rotation of the motor 8 is not reduced by the gear mechanism 50 when the rotation is transmitted to the rotating member 51, the inertia of the motor 8 acting on the rotating member 51 is not amplified when the steering wheel is moved towards its straight-ahead position. Therefore, it is possible to prevent deterioration of the feeling in steering manipulation without requiring complex control.

The present invention is not limited to the abovementioned embodiment. For example, in the embodiment described above, the rotating member 51 and the motor 8 are set to equal speeds of rotation, but the speed of rotation of the rotating member 51 may be set to a greater speed than the speed of rotation of the motor 8. Furthermore, rotational transmission efficiency can be improved by constituting a gear mechanism using two gears without an idle gear.

What is claimed is:

1. An electric power steering device in a vehicle comprising:

a pinion rotated by steering manipulation;

a rack meshing with the pinion;

a rotating member screwed onto the rack via a screw mechanism;

a motor for generating steering assistance force;

a gear mechanism transmitting rotation of the motor to the rotating member, the gear mechanism comprises a first gear rotating together with an output shaft of the motor, a second gear meshing with the first gear, and a third gear meshing with the second gear and rotating together with the rotating member, and the second gear being displaceable with respect to said first gear and said third gear so as to regulate back-lash between the first gear and the second gear and back-lash between the second gear and the third gear;

a gear ratio of said gear mechanism being set so that a speed of rotation of said rotating member being equal to or greater than a speed of rotation of said motor; and an output of said motor being amplified by said screw mechanism.

* * * * *